United States Patent
Thomas et al.

(10) Patent No.: US 9,591,100 B2
(45) Date of Patent: *Mar. 7, 2017

(54) TIERED FRAMEWORK FOR PROVIDING REMOTE ACCESS TO AN APPLICATION ACCESSIBLE AT A UNIFORM RESOURCE LOCATOR (URL)

(71) Applicant: Calgary Scientific, Inc., Calgary (CA)

(72) Inventors: Monroe Milas Thomas, Toronto (CA); David Bruce McFadzean, Toronto (CA); Matthew James Stephure, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 100 days.

This patent is subject to a terminal disclaimer.

(21) Appl. No.: 14/225,584

(22) Filed: Mar. 26, 2014

(65) Prior Publication Data

US 2014/0207858 A1    Jul. 24, 2014

Related U.S. Application Data

(63) Continuation of application No. 13/632,245, filed on Oct. 1, 2012.
(Continued)

(51) Int. Cl.
*H04L 29/06* (2006.01)
*H04L 29/08* (2006.01)
(Continued)

(52) U.S. Cl.
CPC ............ *H04L 67/42* (2013.01); *G06F 9/4445* (2013.01); *G06F 9/44526* (2013.01);
(Continued)

(58) Field of Classification Search
None
See application file for complete search history.

(56) References Cited

U.S. PATENT DOCUMENTS 5,249,121 A    9/1993  Baum
6,151,621 A    11/2000 Colyer et al.
(Continued)

FOREIGN PATENT DOCUMENTS

CA    2646414    10/2007
CA    2697936    3/2009
(Continued)

OTHER PUBLICATIONS

Li, Sheng Feng, Quentin Stafford-Fraser, and Andy Hopper. "Integrating synchronous and asynchronous collaboration with virtual network computing." Internet Computing, IEEE 4.3 (2000): 26-33.*
(Continued)

*Primary Examiner* — Scott B Christensen
*Assistant Examiner* — Sean Concannon
(74) *Attorney, Agent, or Firm* — Meunier Carlin & Curfman LLC

(57) ABSTRACT

Method and systems of providing remote access to an application in a tiered remote access framework that includes a server tier and a client tier. In the server tier, an application that is remotely accessed and a server remote access application execute on a server. In the client tier, a client remote access application executes on a client device. A server SDK may be associated with the application in the server tier, where the server SDK being adapted to communicate display information to the client tier. A client SDK may be associated with a client application executing on the client device, where the client SDK receives the display information from the server tier. The client device connects
(Continued)

to the server at an enumerated Uniform Resource Locator (URL) to initiate the reception of the display information.

20 Claims, 10 Drawing Sheets

Related U.S. Application Data

(60) Provisional application No. 61/541,540, filed on Sep. 30, 2011, provisional application No. 61/623,108, filed on Apr. 12, 2012.

(51) Int. Cl.
*G06F 9/44* (2006.01)
*G06F 9/445* (2006.01)
*G06F 9/54* (2006.01)

(52) U.S. Cl.
CPC .............. *G06F 9/541* (2013.01); *H04L 67/148* (2013.01); *H04L 67/2804* (2013.01); *H04L 67/36* (2013.01)

(56) References Cited

U.S. PATENT DOCUMENTS

| | | | |
|---|---|---|---|
| 6,342,906 B1* | 1/2002 | Kumar | G06F 3/1454 709/201 |
| 6,602,185 B1 | 8/2003 | Uchikubo | |
| 6,662,210 B1 | 12/2003 | Carleton et al. | |
| 6,698,021 B1 | 2/2004 | Amini et al. | |
| 6,742,015 B1* | 5/2004 | Bowman-Amuah | G06F 8/20 709/223 |
| 6,763,371 B1* | 7/2004 | Jandel | G06F 9/542 370/260 |
| 6,938,212 B2 | 8/2005 | Nakamura | |
| 6,981,062 B2 | 12/2005 | Suryanarayana | |
| 6,996,605 B2 | 2/2006 | Low et al. | |
| 7,003,550 B1 | 2/2006 | Cleasby et al. | |
| 7,133,895 B1 | 11/2006 | Lee et al. | |
| 7,152,092 B2 | 12/2006 | Beams et al. | |
| 7,191,233 B2 | 3/2007 | Miller | |
| 7,197,561 B1* | 3/2007 | Lovy | H04L 41/0233 709/217 |
| 7,254,634 B1 | 8/2007 | Davis et al. | |
| 7,287,054 B2 | 10/2007 | Lee et al. | |
| 7,346,616 B2 | 3/2008 | Ramanujam et al. | |
| 7,356,563 B1 | 4/2008 | Leichtling et al. | |
| 7,363,342 B1 | 4/2008 | Wang et al. | |
| 7,533,146 B1 | 5/2009 | Kumar | |
| 7,624,185 B2 | 11/2009 | Miller et al. | |
| 7,676,506 B2 | 3/2010 | Reinsch | |
| 7,810,089 B2 | 10/2010 | Sundarrajan et al. | |
| 7,950,026 B1* | 5/2011 | Urbach | G09G 5/14 715/733 |
| 7,984,115 B2 | 7/2011 | Tien et al. | |
| 8,010,901 B1 | 8/2011 | Rogers | |
| 8,065,166 B2 | 11/2011 | Maresh et al. | |
| 8,122,341 B1 | 2/2012 | Dayan et al. | |
| 8,195,146 B2 | 6/2012 | Prakash et al. | |
| 8,239,773 B1 | 8/2012 | Billman | |
| 8,478,307 B1 | 7/2013 | Hayes | |
| 8,527,591 B2 | 9/2013 | Pirnazar | |
| 8,856,259 B2 | 10/2014 | Burckart et al. | |
| 8,909,703 B2 | 12/2014 | Gupta et al. | |
| 8,935,328 B2 | 1/2015 | Tumuluri | |
| 2001/0037358 A1* | 11/2001 | Clubb | H04L 1/1635 709/203 |
| 2002/0051541 A1 | 5/2002 | Glick et al. | |
| 2003/0179230 A1 | 9/2003 | Seidman | |
| 2004/0045017 A1 | 3/2004 | Dorner et al. | |
| 2004/0249885 A1 | 12/2004 | Petropoulakis et al. | |
| 2005/0114711 A1 | 5/2005 | Hesselink et al. | |
| 2005/0114789 A1 | 5/2005 | Chang et al. | |
| 2005/0154288 A1 | 7/2005 | Wang | |
| 2005/0246422 A1 | 11/2005 | Laning | |
| 2006/0041891 A1* | 2/2006 | Aaron | G09B 7/00 719/315 |
| 2006/0053380 A1 | 3/2006 | Spataro et al. | |
| 2006/0085245 A1 | 4/2006 | Takatsuka et al. | |
| 2006/0112188 A1* | 5/2006 | Albanese | G06F 21/33 709/238 |
| 2006/0179119 A1 | 8/2006 | Kurosawa et al. | |
| 2006/0221081 A1* | 10/2006 | Cohen | G06T 13/00 345/473 |
| 2006/0242254 A1 | 10/2006 | Okazaki et al. | |
| 2007/0143398 A1 | 6/2007 | Graham | |
| 2007/0244930 A1 | 10/2007 | Bartlette et al. | |
| 2007/0244962 A1 | 10/2007 | Laadan et al. | |
| 2008/0028323 A1* | 1/2008 | Rosen | G06Q 10/10 715/752 |
| 2008/0052377 A1 | 2/2008 | Light | |
| 2008/0195362 A1 | 8/2008 | Belcher et al. | |
| 2008/0320081 A1 | 12/2008 | Shriver-Blake et al. | |
| 2009/0070404 A1* | 3/2009 | Mazzaferri | G06F 9/542 709/202 |
| 2009/0094369 A1 | 4/2009 | Wooldridge et al. | |
| 2009/0106422 A1 | 4/2009 | Kriewall | |
| 2009/0172100 A1 | 7/2009 | Callanan et al. | |
| 2009/0187817 A1 | 7/2009 | Ivashin et al. | |
| 2010/0017727 A1 | 1/2010 | Offer et al. | |
| 2010/0115023 A1 | 5/2010 | Peled | |
| 2010/0131591 A1 | 5/2010 | Thomas et al. | |
| 2010/0274858 A1 | 10/2010 | Lindberg et al. | |
| 2010/0306642 A1 | 12/2010 | Lowet | |
| 2011/0047190 A1 | 2/2011 | Lee et al. | |
| 2011/0058052 A1 | 3/2011 | Bolton | |
| 2011/0119716 A1 | 5/2011 | Coleman, Sr. | |
| 2011/0128378 A1 | 6/2011 | Raji | |
| 2011/0154302 A1 | 6/2011 | Balko et al. | |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0219419 A1 | 9/2011 | Reisman | |
| 2012/0072833 A1 | 3/2012 | Song et al. | |
| 2012/0159308 A1* | 6/2012 | Tseng | G06F 9/4443 715/234 |
| 2012/0159356 A1 | 6/2012 | Steelberg | |
| 2012/0210242 A1 | 8/2012 | Burckart et al. | |
| 2012/0210243 A1 | 8/2012 | Uhma et al. | |
| 2012/0233555 A1 | 9/2012 | Psistakis et al. | |
| 2012/0331061 A1 | 12/2012 | Lininger | |
| 2013/0046815 A1 | 2/2013 | Thomas et al. | |
| 2013/0120368 A1 | 5/2013 | Miller | |
| 2013/0159709 A1 | 6/2013 | Ivory et al. | |
| 2013/0208966 A1 | 8/2013 | Zhao et al. | |
| 2013/0297676 A1 | 11/2013 | Binyamin | |
| 2014/0258441 A1* | 9/2014 | L'Heureux | H04W 12/06 709/217 |

FOREIGN PATENT DOCUMENTS

| | | |
|---|---|---|
| CA | 2742779 | 6/2010 |
| EP | 1015068 | 4/2008 |
| WO | 98/25666 | 6/1998 |
| WO | 01/91482 | 11/2001 |
| WO | 2008/011063 | 1/2008 |
| WO | 2012/093330 | 7/2012 |
| WO | 2013/046016 | 4/2013 |
| WO | 2013/072764 | 5/2013 |
| WO | 2013/076554 | 5/2013 |
| WO | 2014/033554 | 3/2014 |

OTHER PUBLICATIONS

Conference Schedule for ADASS XXI, European Southern Observatory, http://www.eso.org/sci/meetings/2011/adass2011/program/schedule.html#day2, Nov. 7, 2011, 4 pages.

GoInstant shared web technology, http://website.s3.goinstant.com.s3.amazonaws.com/wp-content/uploads/2012/04/GoInstant-Shared-Web-Technology.pdf, 2012, 4 pages.

(56) References Cited

OTHER PUBLICATIONS

Press Release, Calgary Scientific Revolutionizes Application Sharing and Advanced Collaboration with PureWeb 3.0, Jun. 21, 2011, 3 pages.
Samesurf web real-time co-browser application, http://i.samesurf.com/i/0586021, 2009.
International Search Report and Written Opinion, dated May 17, 2013, in connection with International Application No. PCT/IB2012/002842.
International Search Report and Written Opinion, dated Feb. 12, 2013, in connection with International Application No. PCT/IB2012/002417.
International Search Report and Written Opinion, dated Jan. 30, 2013, in connection with International Application No. PCT/IB2012/001935.
International Search Report and Written Opinion, dated Jan. 23, 2013, in connection with International Application No. PCT/IB2012/001931.
International Search Report and Written Opinion, dated May 16, 2012, in connection with International Application No. PCT/IB2012/000009.
Luo, Y., et al., "Real Time Multi-User Interaction with 3D Graphics via Communication Networks," 1998 IEEE Conference on Information Visualization, 1998, 9 pages.
International Preliminary Report on Patentability and Written Opinion, dated Feb. 17, 2015, received in connection with related International Application No. PCT/IB2013/002776.
Federl, Pavol, "Remote Visualization of Large Multi-dimensional Radio Astronomy Data Sets," Institute for Space Imaging Science, University of Calgary, 2012, 22 pages.
Yang, Lili, et al., "Multirate Control in Internet-Based Control Systems," IEEE Transactions on Systems, Man, and Cybernetics: Part C: Applications and Reviews, vol. 37, No. 2, 2007, pp. 185-192.
International Search Report and Written Opinion, dated Jun. 9, 2014, received in connection with International Application No. PCT/IB2013/002776.
International Preliminary Report on Patentability, dated May 27, 2014, received in connection with International Application No. PCT/IB2012/002417.
European Search Report, dated Jun. 12, 2014, received in connection with European Application No. 12731899.6.
Supplementary European Search Report, dated Apr. 10, 2015, received in connection with European Application No. 12837201.8.
Hong, C., "Multimedia Presentation Authoring and Virtual Collaboration in Medicine," International Journal of Kimics, vol. 8, No. 6, 2010, pp. 690-696.
Layers: Capture Every Item on Your Screen as a PSD Layered Image, Internet Website, retrieved on Jun. 30, 2016 at http://web.archive.org/web/20140218111143, 2014, 9 pages.
Shim, H.S., et al., "Providing Flexible Services for Managing Shared State in Collaborative Systems," Proceedings of the Fifth European Conference on Computer Supported Cooperative Work, 1997, pp. 237-252.
International Search Report and Written Opinon, dated Jul. 8, 2016, received in connection with International Patent Application No. PCT/IB2016/051856.

* cited by examiner

TIERED FRAMEWORK FOR PROVIDING REMOTE ACCESS TO AN APPLICATION ACCESSIBLE AT A UNIFORM RESOURCE LOCATOR (URL)

CROSS-REFERENCE TO RELATED APPLICATIONS

This application is a continuation of U.S. patent application Ser. No. 13/632,245, filed Oct. 1, 2012, and entitled "Uncoupled Application Extensions Including Interactive Digital Surface Layer for Collaborative Remote Application Sharing and Annotating." The present application also claims priority to U.S. Provisional Patent Application No. 61/541,540, filed Sep. 30, 2011 and U.S. Provisional Patent Application No. 61/623,108, filed Apr. 12, 2012, each entitled "Uncoupled Application Extensions Including Acetate Layer for Collaborative Remote Application Sharing and Annotating." The above applications are incorporated herein by reference in their entireties.

BACKGROUND

Ubiquitous remote access to services, application programs and data has become commonplace as a result of the growth and availability of broadband and wireless network access. As such, users are accessing application programs and data using an ever-growing variety of client devices (e.g., mobile devices, tablet computing devices, laptop/notebook/desktop computers, etc.). Data may be communicated to the devices from a remote server over a variety of networks including, 3G and 4G mobile data networks, wireless networks such as WiFi and WiMax, wired networks, etc. Clients may connect to a server offering the services, applications programs and data across many disparate network bandwidths and latencies.

In such an environment, applications may also be shared among remote users in a collaborative session. However, when collaborating, users may be limited solely to the functionalities provided by the shared application, thus limiting the collaborative session.

SUMMARY

Disclosed herein are systems and methods for providing remote access to an application in a tiered remote access framework. In accordance with the present disclosure, a method of providing remote access to an application is disclosed. The method may include providing a tiered remote access framework comprising a server tier in which an application that is remotely accessed and a server remote access application execute on a server, and a client tier in which a client remote access application executes on a client device; providing a server SDK that is associated with the application in the server tier, the server SDK being adapted to communicate display information to the client tier; and providing a client SDK that is associated with a client application executing on the client device, the client SDK being adapted to receive the display information from the server tier. The client device connects to the server at an enumerated Uniform Resource Locator (URL) associated with the application program to initiate the reception of the display information.

In accordance with other aspects, there is disclosed a method of providing remote access to an application. The method may include providing a tiered remote access framework that includes a server tier in which an application that is remotely accessed and a server remote access application execute on a server; and a client tier in which a client remote access application executes on a client device. The method also includes enumerating a Uniform Resource Locator (URL) that is associated with the application in the server tier; receiving a connection from the client device at the enumerated URL; and communicating display information associated with the application to the client remote access application.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Figure 1:
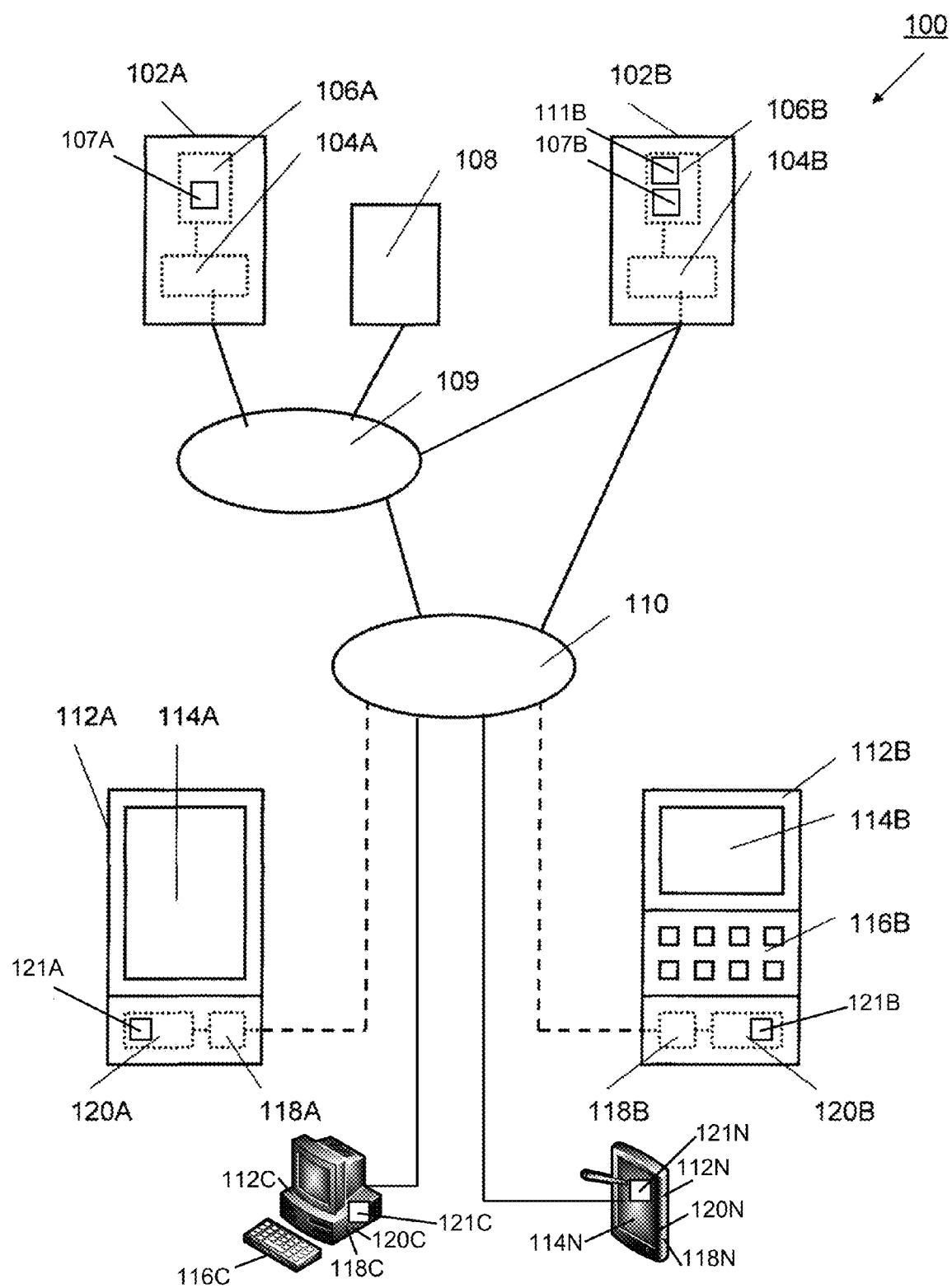
FIG. 1 is a simplified block diagram illustrating a system for providing remote access to an application at a remote device via a computer network.

Referring to FIG. 1, a system 100 for providing remote access to an application, data or other service via a computer network. The system comprises a client computing device 112A or 112B, such as a wireless handheld device such as, for example, an IPHONE 112A or a BLACKBERRY 112B connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, etc.

The server 102B is connected, for example, via the computer network 110 to a Local Area Network (LAN) 109 or may be directly connected to the computer network 110. For example, the LAN 109 is an internal computer network of an institution such as a hospital, a bank, a large business, or a government department. Typically, such institutions still use a mainframe computer 102A and a database 108 connected to the LAN 109. Numerous application programs 107A may be stored in memory 106A of the mainframe computer 102A and executed on a processor 104A. Similarly, numerous application programs 107B may be stored in memory 106B of the server 102B and executed on a processor 104B. The application programs 107A and 107B may be "services" offered for remote access. The mainframe computer 102A, the server 102B and the client computing devices 112A, 112B, 112C or 112N may be implemented using hardware such as that shown in the general purpose computing device of FIG. 7.

A client remote access application 121A, 121B, 121C, 121N may be designed for providing user interaction for displaying data and/or imagery in a human comprehensible fashion and for determining user input data in dependence upon received user instructions for interacting with the application program using, for example, a graphical display with touch-screen 114A or a graphical display 114B/114N and a keyboard 116B/116C of the client computing devices 112A, 112B, 112C, 112N, respectively. For example, the client remote access application is performed by executing executable commands on processor 118A, 118B, 118C, 118N with the commands being stored in memory 120A, 120B, 120C, 120N of the client computing devices 112A, 112B, 112C, 112N, respectively.

Alternatively or additionally, a user interface program is executed on the server 102B (as one of application programs 107B) which is then accessed via an URL by a generic client application such as, for example, a web browser executed on the client computing device 112A, 112B. The user interface is implemented using, for example, Hyper Text Markup Language HTML 5. In some implementations, the server 102B may participate in a collaborative session with the client computing devices 112A, 112B, 112C . . . 112N. For example, the aforementioned one of the application programs 107B may enable the server 102B to collaboratively interact with the application program 107A or another application program 107B and the client remote access applications 121A, 121B, 121C, 121N. As such, the server 102B and each of the participating client computing devices 112A, 112B, 112C . . . 112N may present a synchronized view of the display of the application program.

Figure 2:
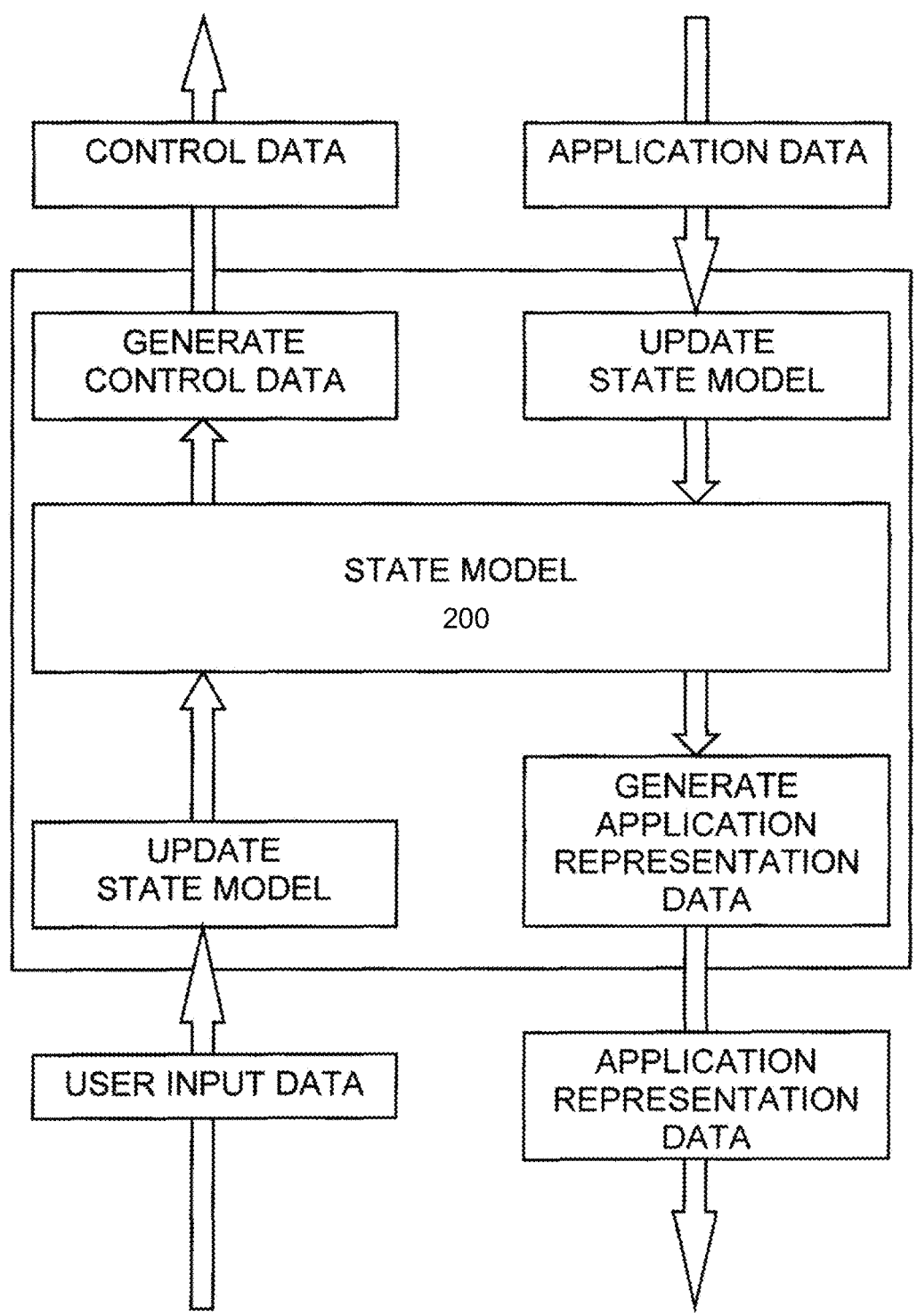
FIG. 2 is a state model in accordance with the present disclosure.

The operation of a server remote access application 111B with the client remote access application (any of 121A, 121B, 121C, 121N, or one of application programs 107B) is performed in cooperation with a state model 200, as illustrated in FIG. 2. An example of the server remote access program is provided in PUREWEB, available from Calgary Scientific, Alberta, Canada. When executed, the client remote access application updates the state model 200 in accordance with user input data received from a user interface program. The remote access application may generate control data in accordance with the updated state model 200, and provide the same to the server remote access application 111B running on the server 102B.

Upon receipt of application data from an application program 107A or 1097B, the server remote access application 111B updates the state model 200 in accordance with the screen or application data, generates presentation data in accordance with the updated state model 200, and provides the same to the client remote access application 121A, 121B, 121C, 121N on the client computing device. The state model 200 comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

The state model 200 is determined such that each of the logical elements is associated with a corresponding state of the application program 107A or 107B. The state model 200 may be determined such that the logical elements are associated with user interactions. For example, the logical elements of the application program are determined such that the logical elements comprise transition elements with each transition element relating a change of the state model 200 to one of control data and application representation data associated therewith.

In some implementations, two or more of the client computing devices 112A, 112B, 112C . . . 112N and/or the server 102B may collaboratively interact with the application program 107A or 107B. As such, by communicating state information between each of the client computing devices 112A, 112B, 112C . . . 112N and/or the server 102B and/or the mainframe computer 102A participating in a collaborative session, each of the participating client computing devices 112A, 112B, 112C . . . 112N may present a synchronized view of the display of the application program 107A or 107B.

In accordance with some implementations, the system 100 may provide for uncoupled or decoupled application extensions. Such extensions are provided as part of the server remote access application 111B (e.g., as a plug-in), the client remote access applications 121A, 121B, 121C, 121N (e.g., as part of a client software development kit (SDK)), one of the applications 107B (e.g., as part of a server SDK), or combinations thereof to provide features and functionalities that are otherwise are not provided by the application programs 107A or 107B. These are described more fully with regard to FIGS. 3A-3B, below. These features and functionalities may be provided without a need to modify the application programs 107A or 107B, as they are integral with the remote access applications. As such, the uncoupled application extensions are agnostic to the application itself, i.e., the application extensions do not depend on the application being displayed within the server remote access application 111B and client remote access application 121A, 121B, 121C, 121N. Further, the application extensions may be made available within controls presented by the server remote access application 111B or client remote access application 121A, 121B, 121C, 121N.

For example, an "interactive digital surface layer" may be provided as an application extension to enable participants to a collaborative session to make annotations on top of the application running in the session. Such a layer may function as an "acetate layer" in that it is transparently overlaid on top of the application running in the session. The interactive digital surface layer functions like a scribble tool to enable a user to draw lines, arrows, symbols, scribbles, etc. on top of an application to provide collaboration of both the application and the interactive digital surface layer. As will be described below with reference to FIGS. 4A and 4B, the interactive digital surface layer is available as a control within the environment of FIG. 1.

Figure 3A:
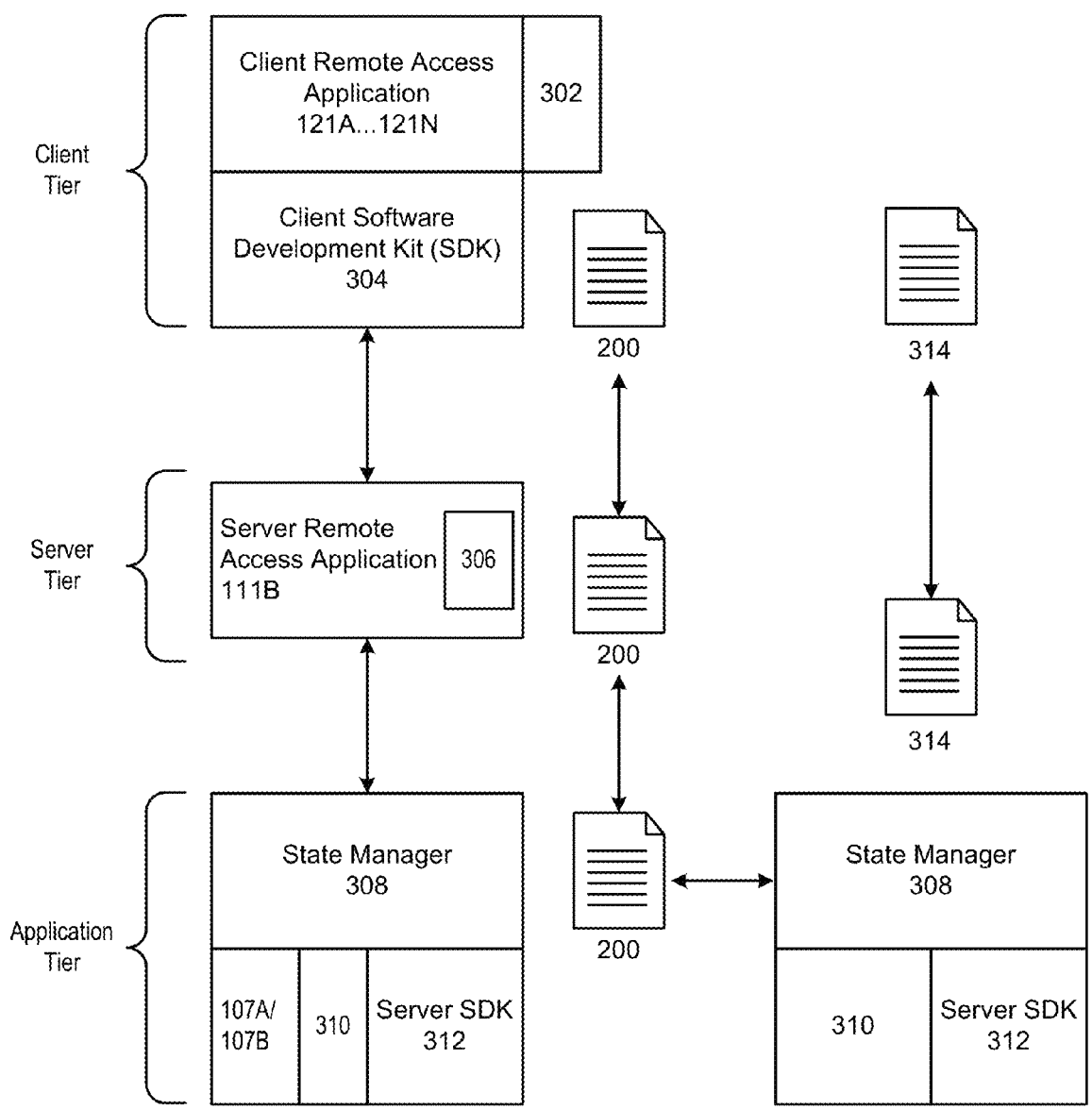
FIG. 3A illustrates additional aspects of the system of FIG. 1.
Figure 3B:
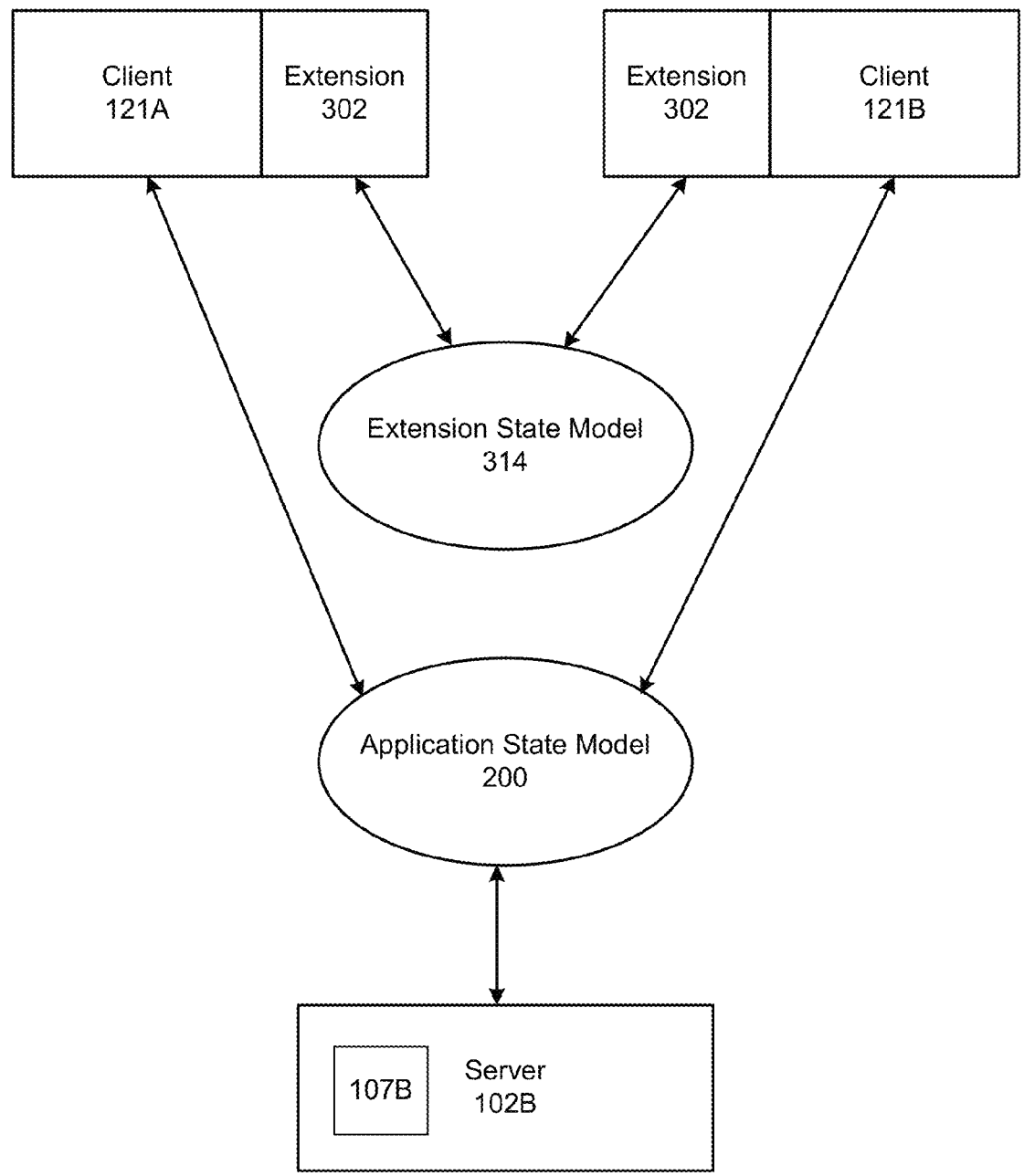
FIG. 3B illustrates the data flow of the extension state model and the application state model within the environment of FIGS. 1 and 2.

FIGS. 3A-3B illustrate aspects of the system 100 of FIGS. 1-2 in greater detail. FIG. 3A illustrates the system 100 as having a tiered software stack. The client remote application 121A, 121B, 121C, 121N may sit on top of a client software development kit (SDK) 304 in a client tier. The client tier communicates to the server remote access application 111B in a server tier. The server tier communicates to a state manager 308 sitting on top of the applications 107A/107B and a server SDK 312 in an application tier. As noted above, the application extensions may be implemented in any of the tiers, i.e., within the server tier as a plug-in 306, the client tier as client application extension 302, the application tier as application extension 310, or combinations thereof. The state model 200 is communicated among the tiers and may be modified in any of the tiers by the application extensions 302 and 310, and the plug-in 306.

In yet another example, in the application tier, the application extension 310 may be a separate executable program that includes new features to enhance the applications 107A/107B. The application extension 310 may consume the state model 200 and produce its own document 314 (i.e., a state model of the application extension 310) that may include: (1) information from the state model 200 and information associated with the application extension 310, (2) only information associated with the application extension 310, or (3) a combination of some of the state model information and information associated with the extension state model 314. The extension state model 314 may be communicated to the server remote access application 111B, where the server remote access application 111B may compose an updated state model 200 to include the information in the extension state model 314. Alternatively or additionally, the client remote access application 121A, 121B, 121C, 121N may receive both the state model 200 and the extension state model 314, and the client remote access application may compose an updated state model 200 to include the information in the extension state model 314.

FIG. 3B illustrates the data flow of the extension state model 314 and the application state model 200 within the environment of FIGS. 1 and 2. As illustrated, the application extensions 302 communicate the extension state model 314 between the client computing devices, e.g., client computing device 121A and client computing device 121B. For example, client remote access applications 121A and 121B may be the communication mechanism used by the application extensions 310 to enable synchronization of the extension state model 314. Concurrently, the application state model 200 is communicated between the client computing device 121A, the client computing device 121B and, e.g., the server 102. As such, in accordance with the data flow of FIG. 3B, the states of the extension 310 and the application 107B may synchronized between the various participants in a collaborative session. Additionally or alternatively, the states are separately maintained to uncouple the extension 310 from the application 107B.

In general, the interactive digital surface layer may be used for any purpose to provide information to a user and/or provide features and functionalities that are independent of the application being shared by users in a collaborative session. The interactive digital surface layer may provide such features concurrently with the execution of the application or as a stand-alone application. For example, the interactive digital surface layer may be used to enable users to annotate a display as the application is executing, to enable pointing operations by the user, and to provide notifications about status or user availability. The interactive digital surface layer may be enabled and disabled by a user control and may be controlled by a session leader or each participant within the collaborative session. Additional features may be provided within the framework discussed above. Details of the above-noted features will now be provided.

Figure 4A:
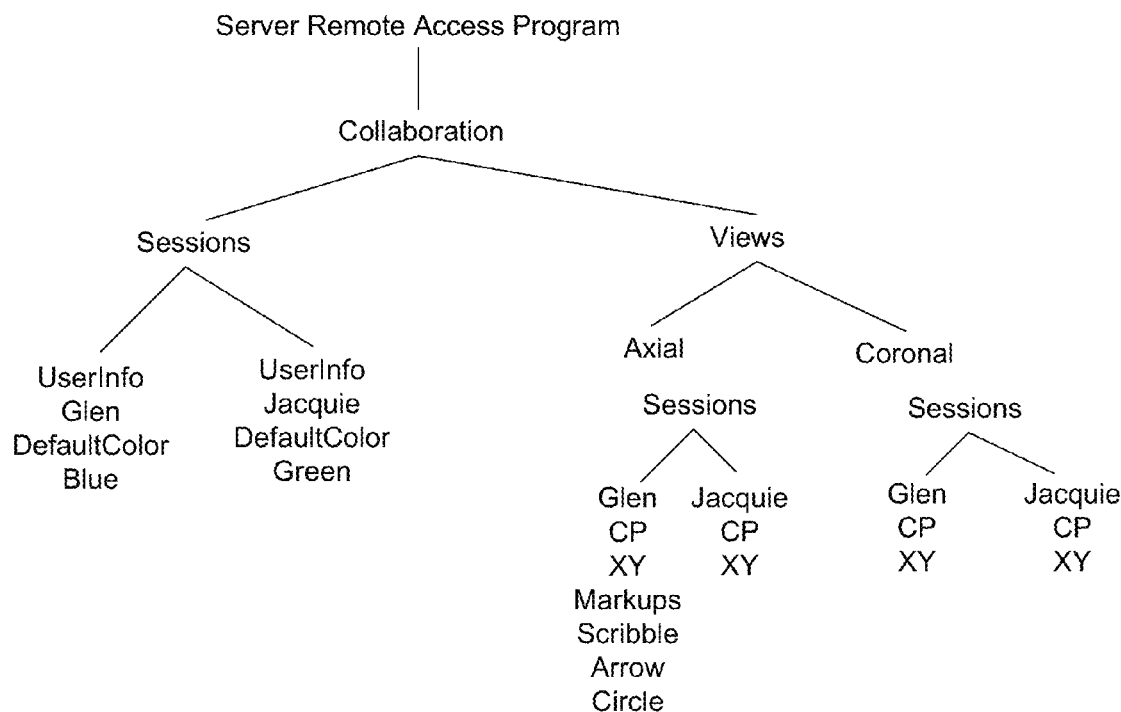
FIG. 4A illustrates a tree within an XML state model document.
Figure 4B:
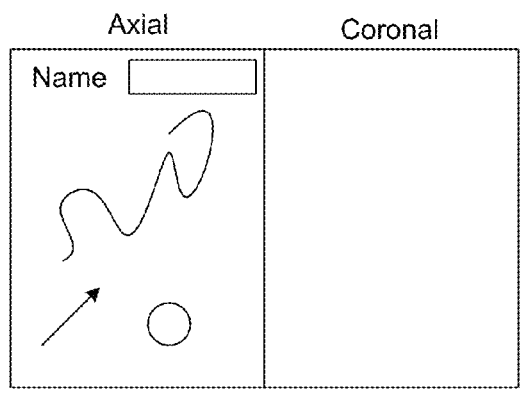
FIGS. 4B and 4C illustrate example axial and coronal medical image views associated with the XML state model of FIG. 4A.
Figure 4C:
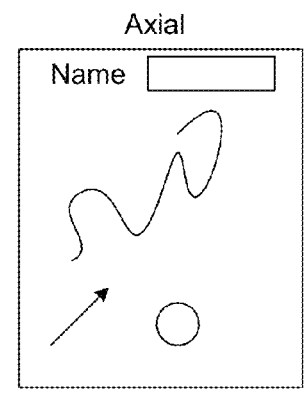

FIG. 4A illustrates a tree within an XML state model document that describes an uncoupled application extension, such as the interactive digital surface layer. FIGS. 4B and 4C illustrate example axial and coronal medical image views associated with the XML state model of FIG. 4A to illustrate the views presented to users within a collaborative session. Within the XML tree, there is a collaboration node defied that includes one or more sessions. The sessions are associated with the application extensions, such as the interactive digital surface layer. The participants in the sessions are identified by a UserInfo tag, and may be, for example Glen and Jacquie. Each participant is assigned a default color (DefaultColor) to represent the user's annotations within the interactive digital surface layer (e.g., blue for Glen and green for Jacquie). Any displayable color may be selected as a default color for participants to the collaborative session. A prioritization of colors may be defined, such that a first user is assigned blue, a second user is assigned green, a third user is assigned orange, etc.

Under the collaboration node there are also one or more views defined. In the example of FIG. 4A, Glen and Jacquie may be collaborating within a medical imaging application. As such, there may be two views defined—an axial view and a coronal view (see, FIGS. 4B and 4C). Sessions are associated with each of the views, where the sessions include the users to the collaboration. For the axial view, Glen's session has associated therewith a cursor position (CP) and certain markups, e.g., a scribble, arrow and circle. In the axial view, Jacquie has an associated cursor position, but since she has not made any markups to the interactive digital surface layer, there is no additional information associated with Jacquie's axial session view. Under the coronal session, each user only has a cursor position associated therewith.

The above information is displayed by the client remote access application as illustrated in axial views of FIGS. 4B and 4C, which may be displayed on a client computing device associated with Glen and Jacquie, respectively. In FIG. 4B, Glen may be viewing the application on a client computing device such as a laptop, which has a mid-sized display. As such, Glen is able to view both the axial view and the coronal view at the same time. With reference to FIG. 4C, Jacquie may be viewing the application on a smaller computing device, such as a handheld wireless device. As such, only the axial view may be presented due to the more limited display area of such a device.

Below is an example section of a state model 200 in accordance with the tree of FIG. 4A. The state model 200 may be represented by, e.g., an Extensible Markup Language (XML) document. Other representations of the state model 200 may be used. Information regarding the application program and interactive digital surface layer is communicated in the state model 200. Because the interactive digital surface layer is uncoupled from the application, the information regarding the interactive digital surface layer is not part of the application state (i.e., it is abstracted from the application). Rather, the interactive digital surface layer information, i.e., the extension state information, is separately maintained in the state model 200, as shown between the Collaboration tags. Other uncoupled application extension may be similarly defined in the state model 200.

```
<ApplicationState >
    <Screens>
        <Screen id="0" name="Axial">
            <Fields>
                <Field name="name" description="Name" default="">
                <Type fieldType="Text" maxChars="128" />
                <Validation />
                </Field>
            </Fields>
        </Screen>
        <Screen id="1" name=" Coronal" />
    </Screens>
    <Screen Data>
        <CurrentScreen id="0" />
        <Screen id="0">
        </Screen>
    </ScreenData>
</ApplicationState>
<Collaboration>
    <Sessions>
        <UserInfo="Glen" DefaultColor="Blue" />
        <UserInfo="Jacquie" DefaultColor="Green" />
    </Sessions>
    <Views>
        <Axial>
            <Sessions>
                <UserName="Glen" CP="XY" Markups=
                "Scribble Arrow Circle" />
                <UserName="Jacquie" CP="XY"/>
            </Sessions>
        </Axial>
        <Coronal>
            <Sessions>
                <UserName="Glen" CP="XY" />
                <UserName="Jacquie" CP="XY"/>
            </Sessions>
        </Coronal>
    </Views>
</Collaboration>
```

Information regarding the application (107A or 107B) is maintained in the ApplicationState node in a first portion of the XML state model. Different states of the application program associated with the axial view and the coronal view are defined, as well as related triggers. For example, in the axial view a "field" is defined for receiving a name as user input data and displaying the same. The uncoupled collaboration states and application extension states (e.g., interactive digital surface layer) are maintained in a second portion of the XML document.

The state model 200 may thus contain session information about the application itself, the application extension information (e.g., interactive digital surface layer), information about views, and how to tie the annotations to specific views (e.g., scribble, arrow, circle tied to axial view).

Figure 5A:
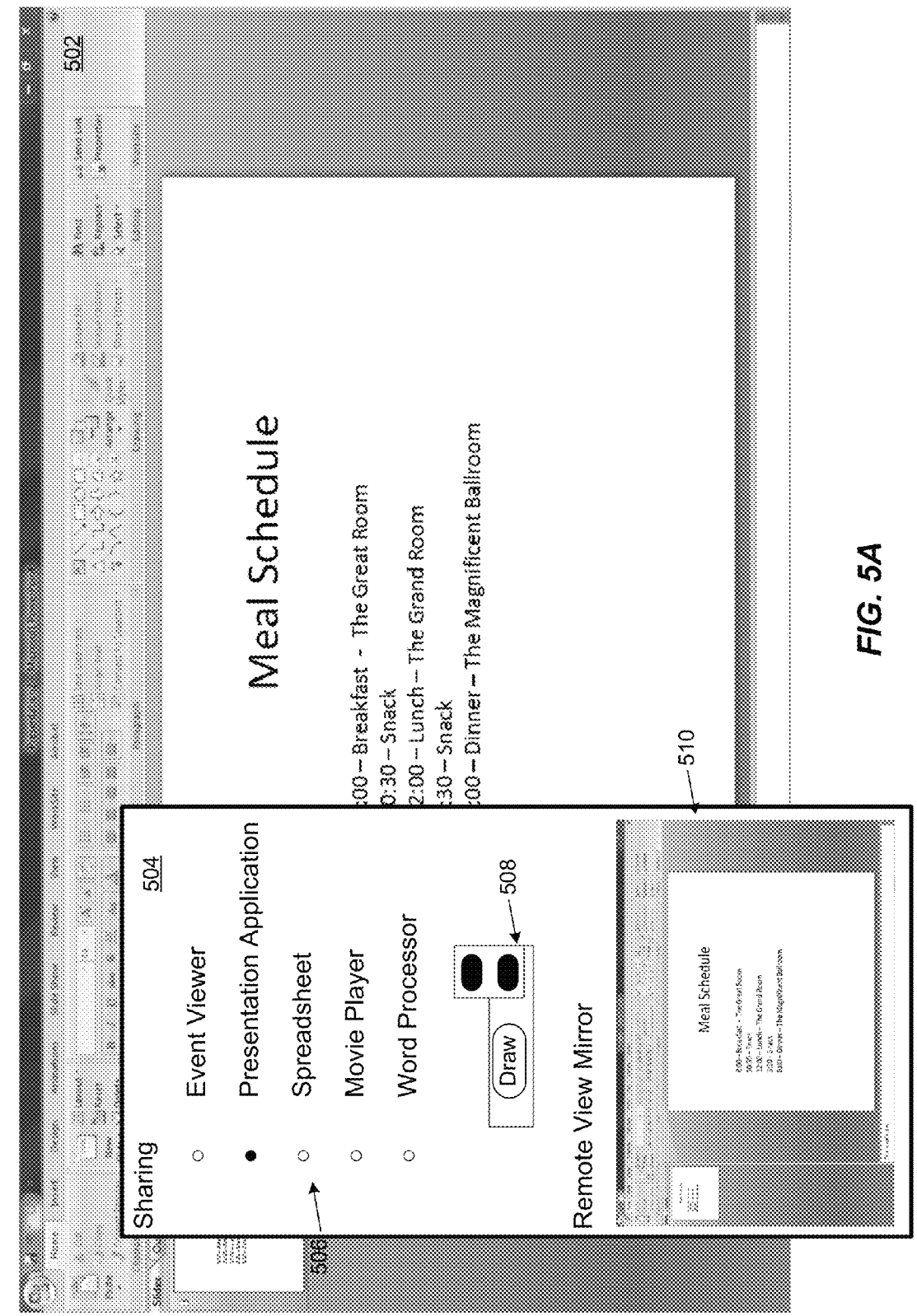
FIGS. 5A and 5B illustrate an example user interface containing an application that may be shared in a collaborative session between users of client computing devices.
Figure 5B:
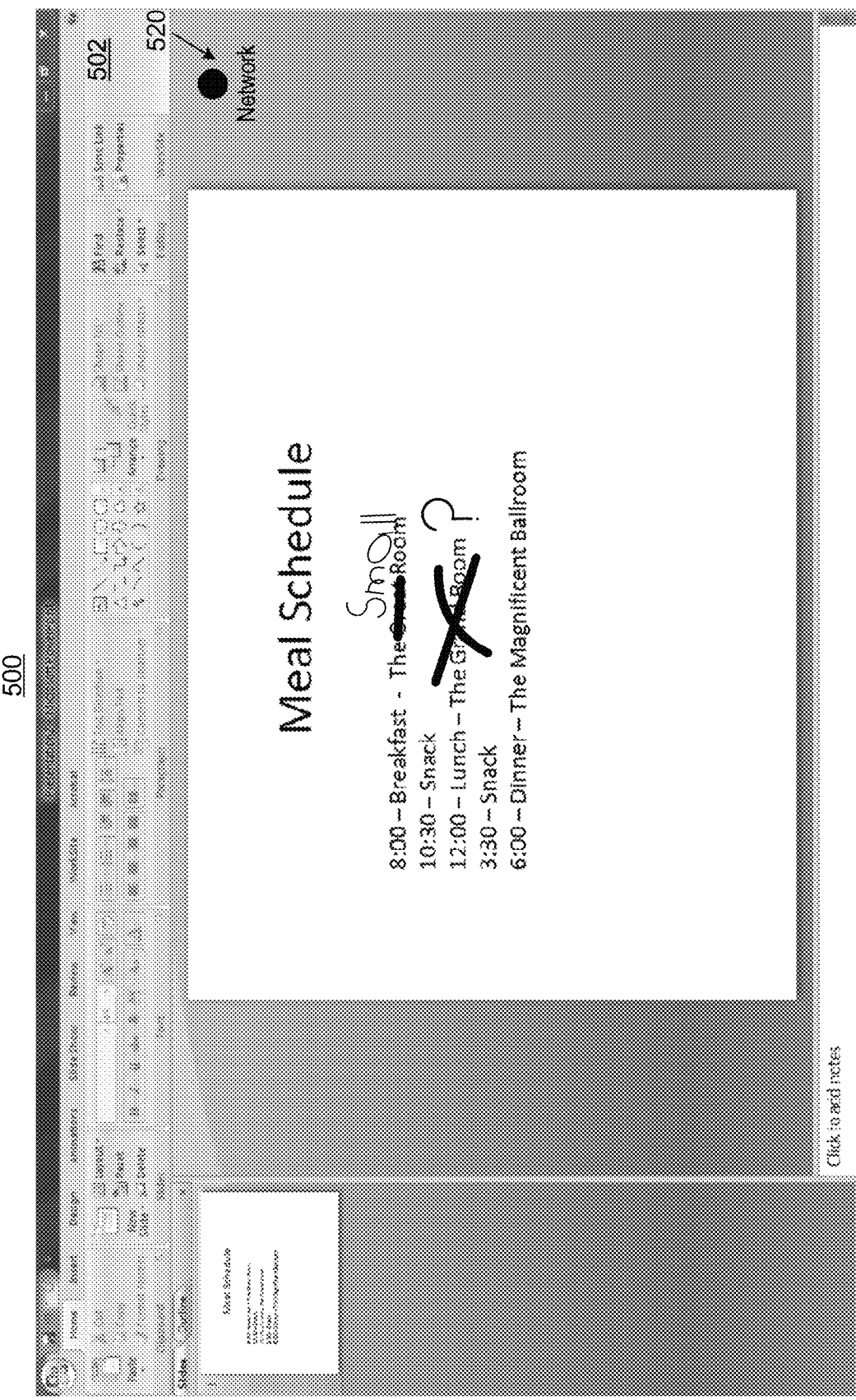

FIGS. 5A and 5B illustrate an example user interface 500 containing an application 502 that may be shared in a collaborative session. In example of FIGS. 5A and 5B, users may be collaborating with a presentation application, such as MICROSOFT POWERPOINT in the user interface 502. In the example, the users are creating a schedule of meals, e.g., for a conference. As shown in FIG. 5A, a user at a first client computing device may activate a sharing control 504 using the client remote access application. The sharing control 504 may provide a list of all available applications which may be shared between users. In the example, five applications may be shared (e.g., an event viewer, the presentation application, a spreadsheet, a movie player, and a word processor). In accordance with an aspect of the present disclosure, the sharing control 504 includes a draw function 508, which activates the interactive digital surface layer described above. The sharing control 504 may optionally include a remote view mirror 510, which displays the user interface as shown on a remote client computing device of another user in the collaborative session.

If the user activates the draw function 508, then the interactive digital surface layer is operable to receive user input to collaboratively display annotations input by the users in the session. As noted above, the annotations may be color-coded to each of the users in the collaborative session. Referring to FIG. 5B, the user interface 500 is shown containing annotations to the application 502 in the interactive digital surface layer. For example, Glen has crossed out the word "Great" has penciled in the word "Small." As another example, Jacquie has crossed out the location of the lunch and replace it with"?" as the location is uncertain. Thus, in view of the above, one of ordinary skill in the art would understand that any type of annotation may be made using the interactive digital surface layer.

FIG. 5B further illustrates an indicator 520, for example, an indicator to show there is network latency associated with at least one of the participants in the collaborative session. For example, a responsiveness indicator such as a spinning wheel, a greyed-out area, etc. may be presented when latency is below a predetermined threshold. Such an indicator may be useful during collaboration where individual users have different network response characteristics. For example, the indicator may be presented to all users so they know someone in a collaborative session is lagging. The indicator may be spawned by a process that examines the extension state model 314 for, e.g., timing information that may be used to calculate that a particular link has a data rate below a threshold.

In accordance with features of the interactive digital surface layer, users may see each other's mouse cursor. Each client may erase annotations made within the interactive digital surface layer. The interactive digital surface layer may be saved either separately from the application, or may be consumed by original application and saved in a meaningful way. The interactive digital surface layer may also be bookmarked in case a collaboration session goes down, such that it can be recovered.

During a collaborative session, a user may wish to point to an area of the user interface 500 without interacting with the underlying application program 107A/107B. For example, a user may be making a presentation of a slide deck and may wish to "point" to an item on the slide being displayed in the user interface 200. The interactive digital surface layer may be used to provide such an indication to other users in the collaborative session.

To accommodate the above, the sending of mouse cursor position data may be separated from the sending of mouse input events to the application 107A/107B so that the position and event data can be triggered independently of one another. As such, a cursor position tool may be directed to send cursor information without input events that would otherwise cause an interaction when the user of the tablet device 112N does not desire such interaction with the application program 107A/107B. The above may be achieved by separating a single method that updates the interactive digital surface layer for cursor position into two methods, one of which performs cursor position updates, and one of which queues the input events. Optionally or additionally, the mouse cursor may change characteristics when operating in such a mode. For example, where the mouse cursor is being used for indication purposes, the cursor may thicken, change color, change shape, blink, etc. to indicate to other users that the cursor is being used as an indicator.

While the above may be implemented for all types of client computers, a particular use case is where users of mobile devices having a touch-sensitive interface (e.g., tablet device 112N) wish to indicate to other users what he or she is currently viewing on the display. Typically, a touch of a tablet device represents an interaction with the application program 107A/107B. In accordance with the above, separating the mouse cursor position data (i.e., the touch location) from the sending of mouse input events (i.e., the actual touch) enables users of tablet devices 112N to make such an indication similar to client computers having a pointing device.

In another aspect that may be combined with the above or separately implemented, annotations can be created in the interactive digital surface layer without interacting with the underlying application program 107A/107B, and interactions with the underlying application program 107A/107B do not necessarily create annotations within the interactive digital surface layer. For example, with reference to FIG. 5B, when Glen crosses the word "Great" and pencils in the word "Small" may he may not want to highlight or change the underlying spreadsheet (i.e., application program 107A/107B). Therefore, sharing control 504 may be provided with an option to disable interaction with the underlying application 107A/107B. On the other hand, Glen may want to guide Jacquie in a tutorial of how to edit the same spreadsheet. In this situation, by not disabling interaction with the application program using the sharing control 504, the interactive digital surface layer may show a cursor to indicate where Glen is currently pointing his mouse and continue to interact with the underlying application program 107A/107B.

Additionally or alternatively to the drawing function above, in some implementations, the interactive digital surface layer may be used to provide other indicators, such as indications of the users within the session, the user who is controlling of the interactive digital surface layer, an indicator that a user has joined or exited a collaboration session, whether changes in image quality (JPEG downsizing) have been made, etc. In general, the indicator may be enabled by providing information in the extension state model 314 that is used to trigger the appearance and/or disappearance of the indicator. In some implementations, the indicator may be temporarily displayed to a user. In other implementations, the indicator may remain until a user action is taken, such as a gesture on the tablet device 112N, a click of a mouse, etc.

In accordance with other implementations, the interactive digital surface layer may be provided access to names of users participating in a collaborative session. The name information may be contained in the extension state model 314 and displayed to other users in the collaborative session using the interactive digital surface layer extension 310. As noted above, each user may be associated with a unique color that may be used for pointer location and mark-up within the interactive digital surface layer. Each user may toggle the visibility of other user's cursor positions. Users may clear their own mark-up, and toggle visibility of other users' mark-up. Among the users, a leader may be chosen or default to an initial creator. The leader may clear all mark-up and transfer leadership. If a leader drops from the collaborative session, the leadership may transfer to a next participant in the session.

To enable the above, client side APIs may be provided the respond to changes in the extension state model 314 to provide the appropriate displays and controls. For example, APIs may be provided to build user interface components, render images in the interactive digital surface layer, provide a capture/clipboard feature, provide an undo/redo feature, provide for changes to image/line thickness, provide for font selection/size/attribute, select a color, provide for text boxes, provide for emoticon/icons, and provide for watermarks (e.g., confidential, draft, working copy).

Based on configuration settings, an API may determine whether the interactive digital surface layer will be "on" for everyone when one user turns the interactive digital surface layer on, if individual users may toggle the visibility of the interactive digital surface layer independent of other users, or if the interactive digital surface layer will be on only if the leader toggles it on. Certain configuration may enable an API to determine whether individual clients may toggle visibility of other users' markup, or if only the leader may control a client's visibility on behalf of everyone. Yet other configuration may enable an API to determine whether individual clients may toggle visibility of other users' cursor position, or if only the leader may control a client's cursor visibility on behalf of everyone. It may be specified that only the leader may clear all other users' markup; however, anyone can clear their own markup at any time.

In some implementations, the state of the interactive digital surface layer may be saved. For example, the extension state model 314 may be saved at the client computing devices 112A, 112B, 112C or 112N for later retrieval. A replay option may be provided to "replay" the states within the extension state model 314 that were received over a period of time during an interactive session. Users may be enabled to save a drawing in the interactive digital surface layer and select from a list of saved images. In some implementations, the images may be saved as a set of vectors in an XML file that is loaded so a user may continue editing the drawing.

Thus, as described above, the present disclosure provides for an interactive digital surface layer that may be independently provided and used collaboratively by users to provide annotations on top of an application. Also, more generally, the present disclosure provides for application extensions that may be made available through a remote access mechanism. The application extensions provide enhancements to applications through the remote access mechanism without the need to modify the applications themselves.

Figure 6A:
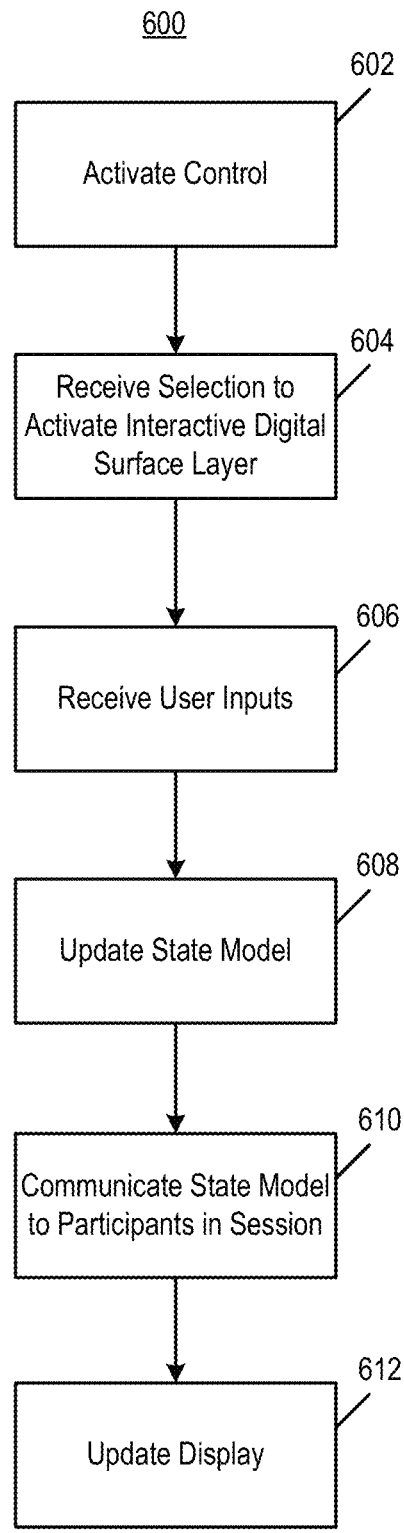
FIG. 6A illustrates a flow diagram of example operations performed within the system of FIGS. 1-5.

FIG. 6A illustrates a flow diagram 600 of example operations performed within the system of FIGS. 1-5. As described above, the server remote access application 111B of the server 102B provides access to one or more applications 107A or 107B, which is displayed by the client remote access application 121A, 121B, 121C, 121N. At 602, a user to a collaborative session activates a control provided by the client remote access application. The control may be, e.g., the sharing control 504.

At 604, a selection is received to activate the interactive digital surface layer. For example, a user may select the draw function 508 in the sharing control 604. At 606, user inputs are received in the interactive digital surface layer. The user inputs may be received as lines, arrows, squiggles, circles, etc., drawn on the interactive digital surface layer by one or more of the users in the collaborative session. The interactive digital surface layer may function to collaboratively receive the inputs from the one or more users in the session.

At 608, the extension state model is updated. For example, the extension state model 314 may be updated to represent the annotations made by each of the users in the collaborative session. Where the user input is a pre-defined shape, such as a circle, line, square or other geometric shape, the extension state model 314 may represent such shapes using XY coordinates. For a line, the XY coordinates may define an origin and together with a length the line may be defined. For a circle, the coordinate point may be a center, and a radius may be defined from the center to represent the circle. Squiggles may be represented by a series of small vectors, that when combined define the shape of the squiggle. The use of coordinates, rather than pixels, provides for scaling of the shapes in the various displays of the client computing devices participating in a collaborative session.

At 610, the extension state model is communicated to the participants in the collaborative session. As described in FIGS. 3A and 3B, the extension state model 314 may be passed among the client computing devices, such that each client computing device is synchronized. The state model 200 also may be passed among the client computing devices and the server, such that with respect to the application, each client computing device and the server are synchronized. At 612, the participant displays are updated to reflect contents of the state model(s). The display of each client computing device and the server may be updated to reflect current state of the extension state model 314 and/or state model 200.

Figure 6B:
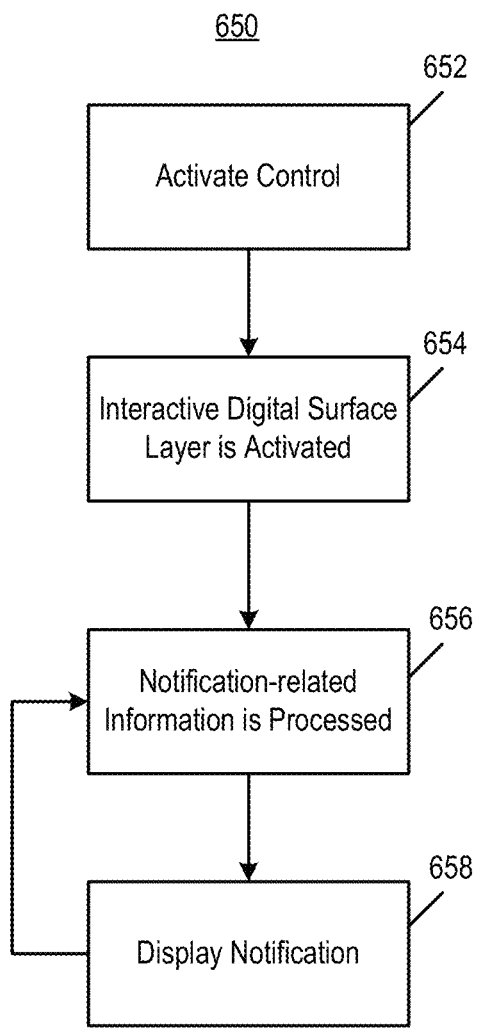
FIG. 6B illustrates a flow diagram of other example operations performed within the system of FIGS. 1-5.

FIG. 6B illustrates a flow diagram 650 of example operations performed within the system of FIGS. 1-5. As described above, the server remote access application 111B of the server 102B provides access to one or more applications 107A or 107B, which is displayed by the client remote access application 121A, 121B, 121C, 121N. At 652, a user to a collaborative session activates a control provided by the client remote access application. The control may be, e.g., the sharing control 504.

At 654, the interactive digital surface layer is activated. For example, a user may select a function in the sharing control 604 or the interactive digital surface layer may be automatically activated at step 652.

At 656, notification-related information is processed. For example, the extension state model 314 is received at the client computing device and an application may process information contained in the extension state model 314 to determine if a notification should be presented. For example, timing information in the extension state model 314 may be examined to determine if a participant in the collaborative session is experiencing network latency. As another example, an identity of a new user to a collaborative session may be indicated.

At 658, a notification displayed, if necessary. If the processing at 656 determines that a notification should be presented, then the notification is presented to the user in the interactive digital surface layer. For example, network latency may be greater than a predetermined threshold; as such that indicator 520 may be presented to the user.

The processes at 656 and 658 may be repeated to determine if the notification should be removed or the notification may be removed after a predetermined time-out period has expired.

Figure 7:
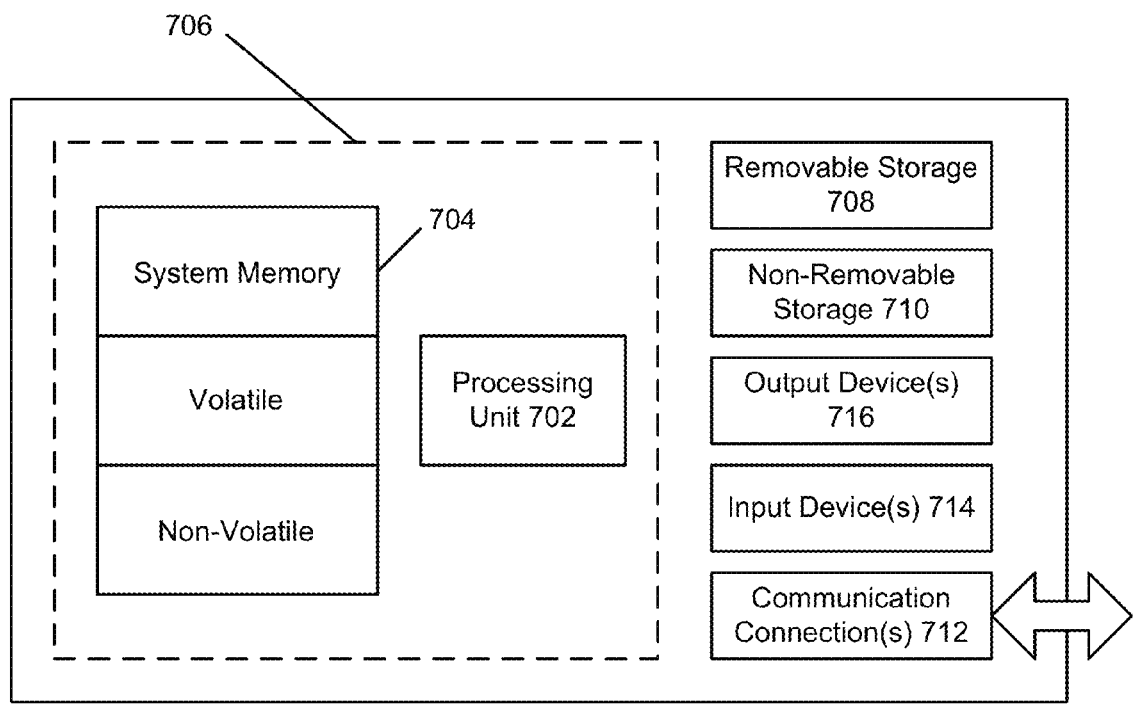
FIG. 7 illustrates an exemplary computing device.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing remote access to an application, comprising:
   providing a tiered remote access framework comprising a server tier in which an application that is remotely accessed and a server remote access application execute on a server, and a client tier in which a client remote access application executes on a client device;
   providing a server SDK that is associated with the application in the server tier, the server SDK being adapted to communicate display information in a state model to the client tier, wherein the state model enables the client device to natively display logical elements of the remotely-accessed application;
   providing a client SDK that is associated with the client remote access application that is executing on the client device, the client SDK being adapted to receive the display information from the server tier, the client SDK and server SDK providing an architecture to execute an extension that provides a functionality that is not otherwise provided by the application;
   updating the state model in accordance with a user interaction with the remote-accessed application, and sending the updated state model to the server tier;
   updating an extension state model associated with the extension to include second information regarding the extension such that the functionality associated with the extension is enabled at the client device, and sending the updated extension state model to the server tier; and
   composing an updated state model based on the state model updates and the extension state model updates, wherein the updated state model enables the client device to natively display modified logical elements of the remotely-accessed application; and
   communicating the composed, updated state model to synchronize a state of the extension between the server tier and the client tier and vice versa;
   wherein the client device connects to the server at an enumerated Uniform Resource Locator (URL) associated with the application program to initiate reception of the display information.

2. The method of claim 1, wherein the display information is processed by the client application to display a view of the application at the client device.

3. The method of claim 2, wherein the server remote access application is used by the application to communicate the display information to the client application.

4. The method of claim 1, wherein the server tier is provided as a software stack on which the application resides.

5. The method of claim 1, further comprising communicating information associated with user inputs received at the client device to the application over a connection established using the enumerated URL.

6. The method of claim 1, further comprising:
   receiving an indication of a user input at the client device; and
   updating a state of the application in accordance with the user input.

7. The method of claim 6, further comprising updating the display information in response to updating the state of the application.

8. The method of claim 1, wherein a second client device connects to the server at the enumerated URL to initiate the reception of the display information at the second client device.

9. The method of claim 8, further comprising synchronizing the display of the client device and the second client device.

10. The method of claim 1, further comprising providing a client-side API in the client SDK that receives the display information from the server tier to present a user interface on the client device.

11. The method of claim 1, wherein the application is hosted by the server.

12. A method of providing remote access to an application, comprising:
   providing a tiered remote access framework comprising:
   a server tier in which an application that is remotely accessed and a server remote access application execute on a server; and
   a client tier in which a client remote access application executes on a client device, the client tier further including an extension that provides a functionality that is not otherwise provided by the application;
   enumerating a Uniform Resource Locator (URL) that is associated with the application communicatively connected to the server tier;
   receiving a connection from the client device at the enumerated URL;
   communicating display information in a state model associated with the application between the client remote access application and the server remote access application, wherein the state model enables the client device to natively display logical elements of the remotely-accessed application;

updating the state model in accordance with a user interaction with the remote-accessed application, and sending the updated state model to the server tier;

updating an extension state model associated with the extension to include second information regarding the extension such that the functionality associated with the extension is enabled at the client device, and sending the updated extension state model to the server tier; and composing an updated state model based on the state model updates and the extension state model updates, wherein the updated state model enables the client device to natively display modified logical elements of the remotely-accessed application; and synchronizing a view of the display information at the client device and the server using the state model.

13. The method of claim 12, wherein a state of the application is communicated in the display information in the state model that is processed by the client application to display the view of the application at the client device.

14. The method of claim 12, further comprising receiving, at the server tier, an indication of user inputs received at the client device to update the state of the application.

15. The method of claim 14, wherein the update to the state of the application is communicated in the display information in the state model that is processed by the client application to display an updated view of the application at the client device.

16. The method of claim 12, further comprising:
providing a server SDK that is associated with the application in the server tier, the server SDK being adapted to communicate display information to the client tier; and providing a client SDK that is associated with a client application executing on the client device, the client SDK being adapted to receive the display information from the server tier.

17. The method of claim 16, wherein the server tier is provided as a software stack on which the application resides.

18. The method of claim 16, further comprising providing a client-side API in the client SDK that receives the display information from the server tier.

19. The method of claim 12, wherein a second client device connects to the server at the enumerated URL to initiate reception of the display information at the second client device.

20. The method of claim 19, further comprising synchronizing the display of the client device and the second client device.

* * * * *